United States Patent [19]
Kang et al.

[11] Patent Number: 5,336,646
[45] Date of Patent: Aug. 9, 1994

[54] METHOD OF SURFACE STRENGTHENING ALUMINA-ZIRCONIA COMPOSITES USING $MoO_2$ AS AN ACCELERANT FOR PHASE TRANSFORMATION OF ZIRCONIA FROM TETRAGONAL TO MONOCLINIC

[75] Inventors: Suk-Joong L. Kang, Taijeon; Yu S. Shin, Kyonggi-do; Nong M. Whang, Taijeon; Duk Y. Yoon, Seoul; Deug J. Kim, Taeku, all of Rep. of Korea

[73] Assignee: Korea Advanced Institute of Science and Technology, Taijeon, Rep. of Korea

[21] Appl. No.: 66,417

[22] Filed: May 25, 1993

[30] Foreign Application Priority Data

Nov. 14, 1992 [KR] Rep. of Korea ............... 1992-21431

[51] Int. Cl.[5] ............ C04B 35/10; C04B 35/48; B05D 3/02
[52] U.S. Cl. .................... 501/105; 501/103; 427/190; 427/201
[58] Field of Search ............... 427/190, 201; 501/103, 501/105; 428/697, 701, 702; 423/608

[56] References Cited

U.S. PATENT DOCUMENTS

| | | | |
|---|---|---|---|
| 3,911,188 | 10/1975 | Torti, Jr. et al. | 428/218 |
| 4,939,107 | 7/1990 | Ketcham | 501/103 |

FOREIGN PATENT DOCUMENTS

| | | | |
|---|---|---|---|
| 58-9784 | 2/1983 | Japan | 501/105 |
| 59-107967 | 6/1984 | Japan | 501/103 |
| 59-213673 | 12/1984 | Japan | 501/103 |
| 62-84442 | 4/1987 | Japan | 428/702 |

OTHER PUBLICATIONS

Valigi, M. et al., "The Effect of Addition of Chromium or Molybdenum, Oxides on the Zirconia Tetragonal-Monoclinic Phase Transformation," Mater. Sci. Monogr., 28B (React. Solids, Pt. B) pp. 1081-1082 (1985) (CA 103(16):129757b).

Montross, C., "Effect of Contaminants from Processing Equipment on the Heat Treatment of Mg-PSZ," Mater. Forum, vol. 14, No. 3, pp. 234-238 (1990) (CERAB 7105964).

Murase, Y. et al., "Stability of $ZrO_2$ Phases in Ultrafine $ZrO_2$-$Al_2O_3$ Mixtures," J. Am. Ceram. Soc., vol. 69, No. 2, pp. 83-87 (1986).

N. Claussen et al, "Phase Transformation of Solid Solutions of $ZrO_2$, and $HfO_2$ in an $Al_2O_3$ Matrix", *Advances in Ceramics*, vol. 3, pp. 164-167 (1981).

D. J. Green, "A Technique for Introducing Surface Compression into Zirconia Ceramics", *J. Am. Ceram. Soc.*, 66[10], c-178 (Oct. 1983).

*Primary Examiner*—Terry J. Owens
*Attorney, Agent, or Firm*—Burns, Doane, Swecker & Mathis

[57] ABSTRACT

$MoO_2$ is used as an accelerant for transformation of zirconia ($ZrO_2$) from a tetragonal to a monoclinic crystal phase. A $ZrO_2$-$MoO_2$ alloy having an increased content of monoclinic $ZrO_2$ is prepared by mixing $MoO_2$ with $ZrO_2$ followed by heat treatment. In another aspect of the invention, the surface of an alumina-zirconia composite is strengthened by heating the composite in the presence of $MoO_2$-$ZrO_2$ mixed powder.

6 Claims, No Drawings

METHOD OF SURFACE STRENGTHENING ALUMINA-ZIRCONIA COMPOSITES USING $MoO_2$ AS AN ACCELERANT FOR PHASE TRANSFORMATION OF ZIRCONIA FROM TETRAGONAL TO MONOCLINIC

BACKGROUND OF THE INVENTION

1. Field of the Invention

The present invention relates to a method of strengthening the surface of alumina-zirconia composites with $MoO_2$ as an accelerant for phase transformation of $ZrO_2$ from tetragonal to monoclinic. More particularly, the present invention relates to a method of using $MoO_2$ for accelerating the phase transformation of zirconia from tetragonal to monoclinic to strengthen the surface of alumina-zirconia composites.

2. Description of the Prior Art

Zirconia ($ZrO_2$) is a ceramic material which is widely used as structural parts, chemical sensors, and so on, attributing to its unique useful, mechanical and electromagnetic properties. It has been reported that $ZrO_2$ shows three polymorphisms such as cubic, tetragonal and monoclinic phases depending on the temperatures under ambient pressure.

Among various physical properties intrinsic to $ZrO_2$, probably the most important is its phase transformability from a tetragonal to a monoclinic phase which is featured by a martensitic transformation. During the above phase transformation, there are neither heat emission nor absorption and no atomic diffusion, while a certain expansion of volume is observed. This property effects an important role to enhance the fracture toughness of polycrystalline $ZrO_2$ or $ZrO_2$-reinforced composites. In particular, when a crack forms in a partially stabilized $ZrO_2$ or a tetragonal $ZrO_2$ polycrystal, the tetragonal $ZrO_2$ around the crack tip is transformed to a monoclinic phase to increase its volume, whereby further development of the crack is prohibited. Similarly, dispersion of fine particles of $ZrO_2$ in a ceramic matrix results in an increase in the fracture toughness of the composite. The elastic strain energy formed on the surface during the development of cleavage is reduced by the phase transformation of $ZrO_2$ from a tetragonal to a monoclinic phase or by the action of the residual stress formed around the $ZrO_2$ particles in the matrix.

Thus, it is important to control the phase transformation of $ZrO_2$ in order to afford desired properties to polycrystalline $ZrO_2$ or $ZrO_2$-reinforced composites. Accordingly, a number of extensive studies on this problem have heretofore been made. Such studies can be categorized into two types: one for controlling the particle size of $ZrO_2$, and the other for changing the structural stability of $ZrO_2$ itself by alloying $ZrO_2$ with suitable solute atoms such as stabilizers or destabilizers (accelerants of the phase transformation).

Various oxides including $Y_2O_3$, CaO and MgO have been known as the stabilizer to suppress the phase transformation of $ZrO_2$ from tetragonal to monoclinic. However, no accelerants have been known for promoting the phase transformation except $HfO_2$.

It has been reported by Claussen et al. that the transformation of a tetragonal phase of $ZrO_2$ to a monoclinic phase can be accelerated by preparing a solid solution of $ZrO_2$ with 30 to 60 mol % of $HfO_2$ in an $Al_2O_3$ matrix. [See, Claussen et al., Advances in Ceramics, vol. 3, p164, (1981).] However, this method has serious drawbacks that an exceedingly large amount of $HfO_2$ should be used in order to attain the desired acceleration of phase transformation.

It has also been reported by Green that upon diffusing and extracting $Y_2O_3$ over the surface of an $Al_2O_3$-($Y_2O_3$ doped) $ZrO_2$ composite by heating the composite in the presence of pure zirconia, compressive residual stresses can be introduced on the surface of the composite, thereby resulting in an improvement in the surface strength. [See, D. J. Green, "A Technique for Introducing Surface Compression into Zirconia Ceramics," J. Am. Cer. Soc., 66[9], C-178, (1983).] However, this method has shortcomings that the amount of $ZrO_2$ transformation from tetragonal to monoclinic is limited by the size of $ZrO_2$ grains employed and that complicated and time consuming procedures should be carried out in order to remove $Y_2O_3$.

SUMMARY OF THE INVENTION

It is therefore an object of the invention to provide a simple and economically viable method of accelerating the transformation of $ZrO_2$ from a tetragonal to a monoclinic phase, whereby a desired degree of transformation can be achieved at an increased rate even if a small amount of the accelerant is used.

It is another object of the invention to provide a $ZrO_2$-$MoO_2$ alloy where the content of monoclinic $ZrO_2$ in ceramic matrices is increased.

It is still another object of the invention to provide a method of strengthening the surface of an $Al_2O_3$-$ZrO_2$ composite.

It is still a further object of the invention to provide an alumina-zirconia composite having a strengthened surface.

Any additional objects of the invention will become apparent through reading the remainder of the specification.

DETAILED DESCRIPTION OF THE INVENTION

We, the inventors of the present invention, have intensively conducted a wide range of experiments in order to develop an improved method for accelerating the phase transformation of $ZrO_2$ from a tetragonal to a monoclinic phase. As a result, it has been surprisingly discovered that by adding $MoO_2$ in a trace amount, for example, several hundred of ppm, $ZrO_2$ contained in a ceramic composite can be readily transformed from the tetragonal to the monoclinic phase and that the degree of the phase transformation can be enhanced with the increase of the amount of $MoO_2$ added.

According to the invention, the transformation of tetragonal $ZrO_2$ to monoclinic $ZrO_2$ in an $Al_2O_3$ matrix can be accelerated by admixing 0.02 to 2.0% by weight of $MoO_2$ with $ZrO_2$ and subjecting the resulting mixture to heat-treatment. The heat-treatment can be carried out at a temperature ranging from about 1,000° C. to about 1,400° C. for less than 4 hours under a nitrogen atmosphere. The heat-treatment allows $MoO_2$ to dissolve into $ZrO_2$ in solid state. The $ZrO_2$ composite thus prepared contains a large amount of monoclinic $ZrO_2$. The content of monoclinic $ZrO_2$ in the composite can be further increased by increasing the amount of $MoO_2$ used.

In another aspect, the present invention provides a method of strengthening the surface of an $Al_2O_3$-$ZrO_2$ composite comprising heating an $Al_2O_3$-$ZrO_2$ composite at a temperature of 1,000° to 1,400° C. for 30 min. to 4 hours in the presence of 0.3 to 10% by weight of $MoO_2$ in a mixture of $ZrO_2$ and $MoO_2$.

In this method, an $Al_2O_3$-$ZrO_2$ powder mixture is isostatically pressed into compacts and the resulting compacts are sintered at about 1,600° C. in air. The sintered material is sufficiently ground and heated in the presence of a $ZrO_2$-$MoO_2$ powder mixture.

There are no limits to the temperatures and time for the heat-treatment, unless they adversely affect negative effects on the control of the diffusion concentration of $MoO_2$. For example, preferred physical properties can be obtained by heating the composite at a temperature of about 1,000 to about 1,400° C. for less than 3 hours in the presence of $MoO_2$ powder.

The $Al_2O_3$-$ZrO_2$ composite which has been subject to the above heat-treatment shows an increased content of monoclinic $ZrO_2$ on the surface of the composite, as high as above 20% by volume, compared with that of an untreated composite. The bending strength of the heat-treated $Al_2O_3$-$ZrO_2$ composite is higher by about 15 to 30% than that of an untreated composite.

Accordingly, the method according to the present invention enables us to produce an $Al_2O_3$-$ZrO_2$ composite having the strengthened surface without surface defects by adjusting the temperatures and the duration of the heat-treatment. Furthermore, according to the invention, the magnitude of the residual stress and the thickness of the stress layer can be easily controlled, and an ideal stress distribution curve which is determined by the concentration of $MoO_2$ can be obtained. In addition, according to the invention, it is possible to reduce the particle size of the monoclinic $ZrO_2$ and to increase the degree of the phase transformation under the action of $MoO_2$.

DESCRIPTION OF THE PREFERRED EMBODIMENT

The present invention will be illustrated in greater detail by way of the following examples. The examples are presented for illustrative purpose only and should not be construed as limiting the invention which is properly delineated in the claims.

EXAMPLE 1

Four groups of sintered specimens were prepared by the following procedures. $MoO_2$ powder was mixed with $ZrO_2$ powder at the concentration of 0.02%, 0.1%, 1%, and 2% by weight, respectively, to give four mixture of $ZrO_2$ powders and $MoO_2$. Each powder mixture was heated at 1,300° C. for 2 hours under a nitrogen atmosphere. The resulting $ZrO_2$-$MoO_2$ solid solution powder was mixed with $Al_2O_3$ powder to give a mixture of $Al_2O_3$-$ZrO_2$ powder containing 15% by volume of $ZrO_2$. The powder mixture was subject to cold isostatic pressing, while maintaining the relative density of the powder at 65%, and then sintered at 1,600° C. for an hour under atmospheric pressure in air to give a specimen to be tested.

For the purpose of comparison, a standard $Al_2O_3$-15 vol. % $ZrO_2$ specimen without $MoO_2$ was prepared by repeating the same procedures as described above, except that pure $ZrO_2$ powder was mixed with $Al_2O_3$.

The amount of the transformed monoclinic $ZrO_2$ was determined by an X-ray diffraction technique. The results are shown in Table 1 below.

TABLE 1

| Content of Monoclinic $ZrO_2$ in pressureless sintered $Al_2O_3$-15 vol. % $ZrO_2$ | |
|---|---|
| Amount of $MoO_2$ used (wt %) | Content of monoclinic $ZrO_2$ (vol %) |
| 0 | 29.0 |
| 0.02 | 83.4 |
| 0.1 | 93.2 |
| 1 | 95.2 |
| 2 | 97.1 |

As can be seen from Table 1, the standard specimen shows 29.0% by volume of transformability from a tetragonal to monoclinic phase, while the specimen in which $MoO_2$ is used in an amount of 0.02% by weight shows above 80% by volume of transformability. The data in Table 1 also shows that the amount of $ZrO_2$ transformed to a monoclinic phase increases as the amount of $MoO_2$ used increases.

EXAMPLE 2

Two specimens containing 0.02 and 0.04% by weight, respectively, of $MoO_2$ according to the invention, and a standard specimen without $MoO_2$ were prepared by repeating the same procedures as in Example 1, except that the sintering was carried out under high pressure of 30 MPa. The results of an X-ray diffraction of the specimens are listed in Table 2 below.

TABLE 2

| Content of Monoclinic $ZrO_2$ in hot-pressed $Al_2O_3$-15 vol. % $ZrO_2$ specimens | |
|---|---|
| Amount of $MoO_2$ used (wt %) | Content of monoclinic $ZrO_2$ (vol %) |
| 0 | 11.5 |
| 0.02 | 40.0 |
| 0.04 | 43.6 |

From Table 2 above, it is noted that a substantial increase, namely, about 4-fold higher than that of the standard specimen, in the transformability to a monoclinic phase can be obtained by adding $MoO_2$ to $ZrO_2$. The transformability increases with the increase in the amount of $MoO_2$ used.

EXAMPLE 3

A mixture of $Al_2O_3$-15 vol. % pure $ZrO_2$ powder was compacted in a rod-shaped die of 2 mm×20 mm in dimension. The resulting compact was isostatically pressed and then sintered in a vertical tube furnace at 1,600 ° C. for 30 minutes in air. The sintered material was polished to 1 μm finish and heated at 1,350° C. for 30 minutes within a $ZrO_2$-$MoO_2$ mixed powder bed containing $MoO_2$ powder at the concentration of 0.3, 1, 3, and 10% by weight, respectively, to give four specimens that are to be used in testing the bending strength thereof.

For the purpose of comparison, a standard specimen which was not subject to the heat-treatment in the presence of the $ZrO_2$-$MoO_2$ mixed powder was prepared in the same manner as described above.

The four-point bending strength and the amount of $ZrO_2$ transformed to a monoclinic phase of each specimen were measured. The results are shown in Table 3 below.

TABLE 3

Content of monoclinic $ZrO_2$ at the surface of various $Al_2O_3$-15 vol. % $ZrO_2$ specimens and their bending strength

| Amount of $MoO_2$ contained in $ZrO_2$—$MoO_2$ mixed powder (wt %) | Content of Monoclinic $ZrO_2$ (vol %) | Bending Strength (MPa) |
| --- | --- | --- |
| 0 | 30 | 455 |
| 0.3 | 49 | 518 |
| 1 | 53 | 536 |
| 3 | 56 | 569 |
| 10 | 62 | 586 |

As can be seen from Table 3 above, the content of the monoclinic $ZrO_2$ is increased by above 60% and the bending strength by above 15% after the heat-treatment of the specimen in a $ZrO_2$-$MoO_2$ powder mixture. As the amount of $MoO_2$ contained in the $ZrO_2$-$MoO_2$ mixed powder increases, the content of monoclinic $ZrO_2$ and the bending strength also increase.

What is claimed is:

1. A method of accelerating phase transformation of zirconia from a tetragonal to a monoclinic crystal phase consisting essentially of the steps of:

mixing 0.02 to 2% by weight of $MoO_2$ with zirconia; and subjecting the resulting mixture to heat-treatment.

2. The method of claim 1, wherein the heat-treatment is carried out at about 1,000° C. to about 1,400° C. for less than 4 hours under nitrogen atmosphere.

3. A $ZrO_2$-$MoO_2$ alloy, consisting essentially of a heat-treated mixture of zirconia and from 0.02 to 2% by weight $MoO_2$.

4. A method of strengthening the surface of an alumina-zirconia composite which comprises heating said alumina-zirconia composite in the presence of 0.3 to 10% by weight of $MoO_2$-$ZrO_2$ mixed powder.

5. The method of claim 4, wherein the heating is carried out at about 1,000° C. to about 1,400° C. for less than 3 hours.

6. A surface strengthened $Al_2O_3$-$ZrO_2$ composite which is prepared by the method according to any of claims 4 and 5.

* * * * *